United States Patent [19]

Dorschner

[11] Patent Number: 5,018,835
[45] Date of Patent: May 28, 1991

[54] DEFLECTOR FOR AN OPTICAL BEAM INCLUDING REFRACTIVE MEANS

[75] Inventor: Terry A. Dorschner, Newton Centre, Mass.

[73] Assignee: Raytheon Company, Lexington, Mass.

[21] Appl. No.: 292,787

[22] Filed: Jan. 3, 1989

[51] Int. Cl.$^5$ .............................................. G02F 1/133
[52] U.S. Cl. .................................... 350/336; 350/334; 350/347 V
[58] Field of Search ................... 350/347 V, 334, 336, 350/347 R

[56] References Cited

U.S. PATENT DOCUMENTS

| | | | |
|---|---|---|---|
| 3,791,716 | 2/1974 | Borel et al. | 350/347 V |
| 3,915,548 | 10/1975 | Opittek et al. | 350/334 |
| 4,639,091 | 1/1987 | Huignard et al. | 350/347 V |
| 4,813,766 | 3/1989 | Keene et al. | 350/335 |
| 4,882,235 | 11/1989 | Resler | 350/336 |

FOREIGN PATENT DOCUMENTS

| | | | |
|---|---|---|---|
| 0003417 | 1/1984 | Japan | 350/337 |
| 0117215 | 6/1985 | Japan | 350/337 |

*Primary Examiner*—Stanley D. Miller
*Assistant Examiner*—Anita Pellman Gross
*Attorney, Agent, or Firm*—Christopher L. Maginniss; Richard M. Sharkansky

[57] ABSTRACT

An optical beam phase shifter includes a liquid crystal cell having a common electrode on a first window and a multiplicity of parallel stripe electrodes on a second window. A multiplicity of control signals are applied between the individual stripe electrodes and the common electrode, thereby creating local variations of the refractive index of the liquid crystal molecules therebetween, which variations cause differential phase shifts across the cross section of a light beam incident thereon. An optically-refractive element, having an index of refraction greater than the index of refraction of the liquid crystal cell, is interposed between the beam and the liquid crystal cell. The refractive element, illustratively a prism, increases the angle of incidence of the beam entering the cell, thereby increasing the beam travel distance through the liquid crystal molecules. The disclosed structure allows the use of a thinner layer of liquid crystal molecules, and hence, improved response time of the optical beam phase shifter to changes in the control signals, and reduced fringing effects between stripe electrodes.

22 Claims, 6 Drawing Sheets

DEFLECTOR FOR AN OPTICAL BEAM INCLUDING REFRACTIVE MEANS

BACKGROUND OF THE INVENTION

The present invention relates generally to optical systems and, more particularly, to an electrically tunable, optical beam steerer for use in an optical phased array antenna.

There are currently very pressing needs for rapid, large-angle pointing and scanning of laser beams of all wavelengths from the infrared through the ultraviolet. These needs include strictly military applications such as laser weapons, which require agile, high energy laser pointing, and laser radar, used for target search, acquisition, tracking and surveillance. There are also purely commercial needs such as laser light shows and laser printing, which require rapid, programmable beam steering. In addition, there are also many areas common to both military and commercial interests such as optical computing and image processing, which require rapid scanning of spatial light modulators, and optical data storage requiring rapid optical addressing. In most of these cases, the impediment to effective performance of the optical system is in the area of beam steering.

Presently available technologies are generally not sufficiently advanced to supply the need for rapid, large-angle pointing and scanning of optical beams and, in particular, of large diameter, diffraction limited carbon dioxide ($CO_2$) laser radar beams. In many systems, optical beam steering is currently performed using rotating optical elements. Such systems typically consist of galvanometer mirrors and afocal telescopes, performance being limited to beam diameters of somewhat less than six inches, a field of view of approximately five degrees in each direction, and a frame time of approximately one second with a few thousand resolution cells and open loop random access time in the order of ten milliseconds. The capability of handling larger beams is required for higher power systems, particularly for many of the military applications for $CO_2$ laser radar systems. Larger fields of view and larger apertures, on the order of one-half to one meter, are of great interest, and faster scan times are desired for many applications. In short, there exists a pressing need for an optical version of the versatile phased array antennas now widely used for microwave radar systems.

A static deflector for deflecting a polarized infrared beam is disclosed in U.S. Pat. No. 4,639,091, issued Jan. 27, 1987, to J.-P. Huignard et al. The Huignard et al. deflector comprises a layered square plate having as a front layer a window on which stripe electrodes are disposed. Both the window and the stripe electrodes are transparent to an incident infrared beam. A middle layer of the deflector comprises an electro-optical liquid crystal layer. The bottom layer comprises a substrate having a common electrode adjacent the liquid crystal layer. The common electrode is preferably reflective at the beam wavelength, illustratively it is a gold film; alternatively, for a deflector operating by transmission, a transparent rear plate may be used.

Huignard et al. discloses a periodic staircase waveform comprising N voltage steps which are applied to the stripe electrodes, thereby creating local variations of the refractive index in the liquid crystal layer in such a manner as to form a beam diffraction grating of adjustable period.

One of the shortcomings of the Huignard et al. deflector lies in the poor response time of the liquid crystal molecules to the application of, and, more particularly, the removal of, the control voltage. Although the molecules align themselves relatively quickly along the direction of an electric field induced by the application of a control voltage, the time required for the molecules to have their quiescent alignment restored following the removal of the control voltage may be totally unacceptable for the beam steering rates required by many applications. The Huignard et al. patent indicates that the response time may be improved by optimizing certain parameters such as the structure of the liquid crystal, its viscosity, and the operating temperature.

The present invention provides improved response time for an optical beam deflector by recognizing that the response time of liquid crystal molecules increases as the square of the thickness of the liquid crystal layer. Therefore, it is advantageous to establish as thin a layer of the liquid crystal as is possible. Nevertheless, the present invention also recognizes that for the liquid crystal layer to be effective as a beam steerer, the optical beam must travel through a sufficient thickness of liquid crystal molecules to accumulate approximately one full wave of phase shift.

SUMMARY OF THE INVENTION

It is therefore a primary object of the present invention to provide an improved optical beam steerer.

It is a further object of this invention to provide an optical beam steerer which is an improvement over the prior art in that it provides faster steering for large-angle deflection of large diameter laser radar beams.

It is a further object of this invention to provide an optical beam steerer which is an improvement over the prior art in that it can be made to minimize the effects of fringing between zones of unequal potentials, thereby improving the achievable spatial resolution of the refractive index profile and the corresponding efficiency of beam steering.

These and other objects of this invention are obtained generally by providing an apparatus for deflecting an incident optical beam. The apparatus comprises a liquid crystal cell including two windows, a first one of the windows having a common electrode and the second window having a multiplicity of electrodes in the form of electrically-isolated parallel stripes, and a layer of liquid crystal molecules in the space between the first and second windows. The apparatus also comprises means for coupling a multiplicity of control signals individually between the multiplicity of stripe electrodes and the common electrode, thereby creating local variations of refractive index in the liquid crystal layer. Refractive means are interposed between the incident optical beam and one of the windows, the refractive means increasing the angle of incidence of the beam entering the liquid crystal layer.

In one embodiment of the present invention, the refractive means comprises a prism having a first face adjoining one of the windows, and wherein the incident optical beam is directed onto a second face of the prism. This embodiment also includes reflective means responsive to the optical beam exiting from the liquid crystal layer for reflecting the optical beam back through the liquid crystal layer.

In another embodiment, the refractive means comprises first and second prisms, the first prism having a first face adjoining one of the windows, and the second prism having a first face adjoining the other window, and wherein the incident optical beam is directed onto a second face of the first prism.

In still another embodiment, the refractive means comprises a plurality of prisms having first faces adjoining one of the windows, and wherein the incident optical beam is directed against second faces of the prisms at an angle which prevents the effects of shadowing.

In some of the embodiments disclosed herein, the functions of one of the windows and the refractive means are combined in a single prism structure. Furthermore, in some of the embodiments disclosed herein, the refractive index of the material of the window not adjoined to the refractive means is selected to provide total reflection of the beam exiting from the liquid crystal layer.

BRIEF DESCRIPTION OF THE DRAWINGS

The foregoing features of the present invention, and the advantages thereof, may be fully understood from the following detailed description, read in conjunction with the accompanying drawings, wherein.

DETAILED DESCRIPTION OF THE PREFERRED EMBODIMENTS

Figure 1:
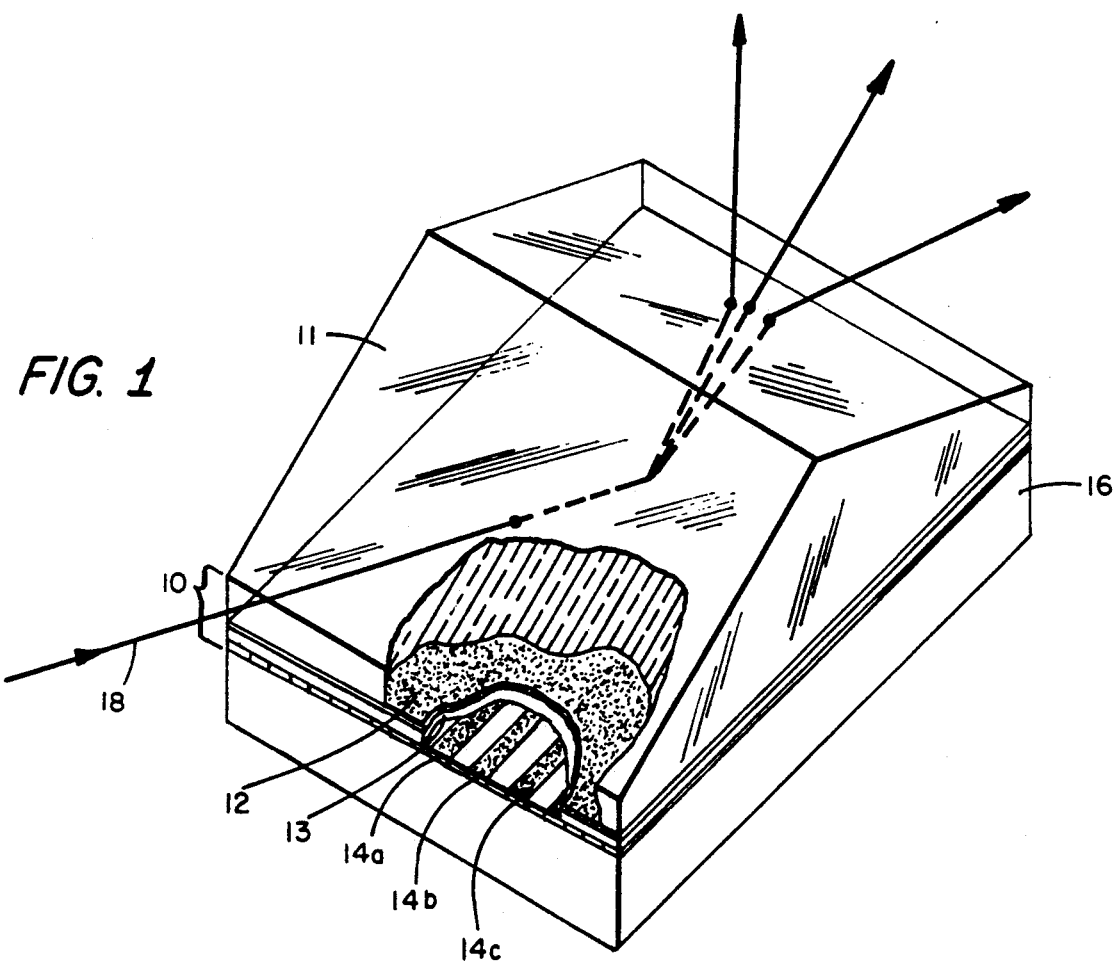
FIG. 1 is an isometric view of an optical beam steerer according to the present invention.

Referring to FIG. 1, there is shown a simplified and dimensionally exaggerated isometric view of an optical beam steerer according to the principles of the present invention. The steerer includes an optical subsystem 10 and an electronics module 16. Optical subsystem 10 includes an optically-transmissive prism 11, a common electrode 12, a multiplicity of stripe electrodes referred to collectively as stripe electrodes 14, and a layer of liquid crystal molecules 13 therebetween. Stripe electrodes 14a, 14b and 14c, illustrated in FIG. 1, are representative of a large number of stripe electrodes as would be implemented in a practical system. Electronics module 16 supplies appropriate control signals between common electrode 12 and stripe electrodes 14.

The optical beam steerer of FIG. 1 is responsive to a light source and beam forming network (not shown) which provide a coherent, polarized light beam, typically in the infrared spectrum, having a typical wavelength in the range of 1 to 20 $\mu$meters ($\mu$m), illustratively at 10.6, $\mu$m. It will be recognized, however, that the principles taught herein will be applicable also to light in the visible and near infrared bands. The light beam, represented in the figure as a single ray 18, is directed onto a first face of prism 11, resulting in an oblique angle of incidence through the layer of liquid crystal molecules 13. The beam 18 is directed such that its projection onto the plane formed by stripe electrodes 14 is parallel to the direction of electrodes 14.

It is characteristic of liquid crystal molecules that the application of an electric field affects the refractive index, and hence, the speed of light propagated therethrough. Thus, in the simplified example of FIG. 1, the application of different potentials individually to stripe electrodes 14 results in differential electric fields in the regions between electrodes 14 and common electrode 12, thereby creating local variations of the refractive index in the liquid crystal layer 13. One advantage provided by the present invention lies in the independent control of the voltages to the individual stripe electrodes. Whereas the Huignard et al. patent teaches a periodic staircase waveform comprising N continuous voltage steps between a minimum value and a maximum value applied to the electrodes of a deflector, the maximum value being chosen so as to provide exactly $2\pi$ or one full wave of phase shift, no such limitation on the applied voltages is required by the present invention. The requirement of a continuous periodic range of amplitude $2\pi$ restricts the allowable beam positions to a set separated angularly by the far field divergence angle of the device, i.e., separated by one Rayleigh spot size. Indeed, by the appropriate selection of voltages on the individual electrodes of the herein-disclosed beam steerer, increments of the scanning angle can be reduced to much less than the diameter of a beam footprint or far field spot size, similar to operation of a microwave phased array antenna, wherein, as is well known in the art, super-resolution, i.e., resolution exceeding that of the Rayleigh criterion, is regularly achieved.

A beam steerer of the type including a multiplicity of individually-addressable stripe electrodes, as well as a preferred method for providing electrical connectivity to the multiplicity of stripe electrodes, is disclosed in co-pending U.S. patent application, Ser. No. 253,021, "Deflector for an Optical Beam," filed Oct. 4, 1988, for T. A. Dorschner et al., and assigned to the same assignee as the present invention, which application is incorporated herein by reference. It is therefore seen that the optical beam deflector of FIG. 1 provides selective beam steering in accordance with the electrical potentials applied to stripe electrodes 14.

Figure 2:
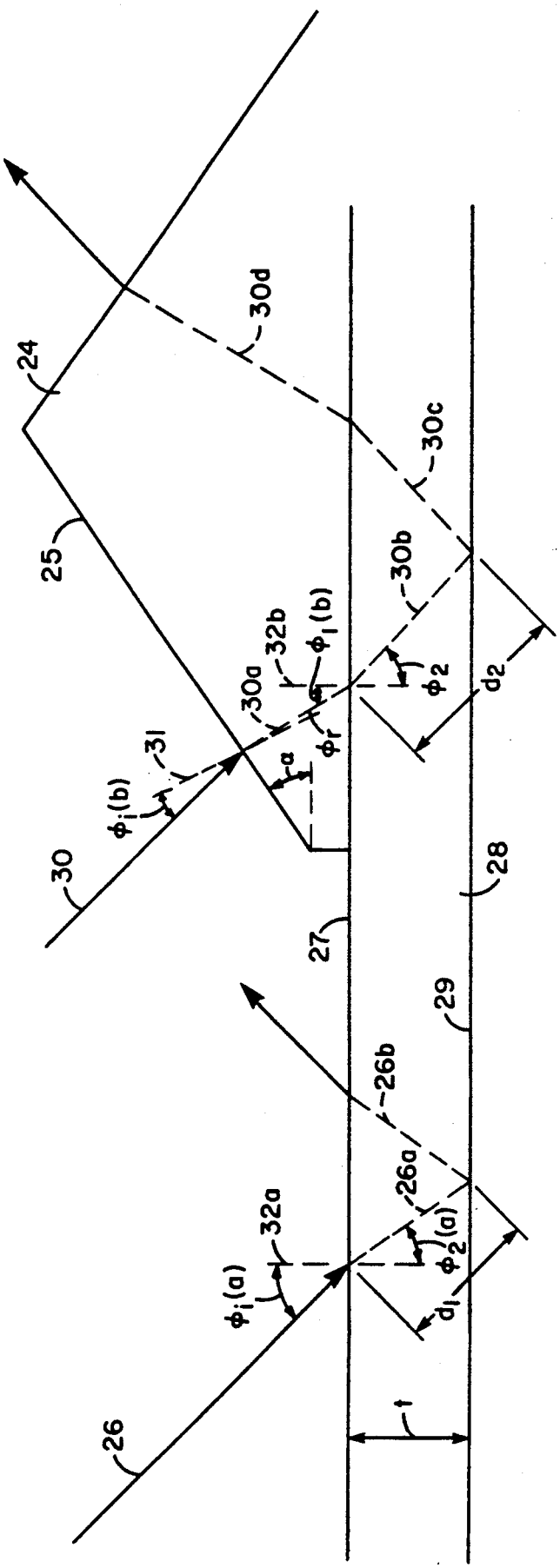
FIG. 2 illustrates an optical beam path through the beam steerer of FIG. 1.

Referring to FIG. 2, there is illustrated (in exaggerated scale) the effect of beam refractions provided by structure according to the teachings of the present invention. FIG. 2 demonstrates the effect of prism 24 on the path of light beam 30 as it passes through liquid crystal layer 28. For purposes of comparison, light beam 26 is shown propagating parallel to beam 30, and is incident directly on liquid crystal layer 28, without the refractive effect of prism 24. Dashed line 26a represents the path which beam 26 would traverse through layer 28 without prism 24, and dashed line 26b is the reflection path of beam 26; dashed lines 30a and 30b represent the path of beam 30 through prism 24 and layer 28, respectively, and dashed lines 30c and 30d represent the exit path of beam 30 through layer 28 and prism 24, respectively.

It is known from Snell's law of refraction, that light passing from a first transmissive optical medium having a first index of refraction into a second transmissive optical medium having a second index of refraction will bend toward the normal to the boundary surface if the second index of refraction is greater than the first, and will bend away from the normal to the boundary surface if the second index of refraction is less than the first. With no prism included in the optical device of the present invention (as is taught in the prior art), light beam 26 passes through air, having an index of refraction n=1.0, into liquid crystal layer 28 which, for the purposes of the present example, may be assumed to have an overall average index of refraction n=1.7. In this case, light beam 26 (represented in layer 28 as dashed line 26a) would be bent toward the normal 32a to surface 27, since the beam is passing from a first medium to a second medium, the index of refraction of the second medium being greater than the index of refraction of the first medium.

In accordance with the teachings of the present invention, light beam 30, parallel to beam 26, passes through prism 24 before entering liquid crystal layer 28. Prism 24 is selected to have an index of refraction greater than the average index of refraction of liquid crystal layer 28. Illustratively, prism 24 may comprise gallium arsenide (GaAs) and have an index of refraction n=3.27 at 10.6 μm wavelength. Since, in this case, light beam 30a in prism 24 is passing from an optical medium having a first index of refraction into a second optical medium having a second index of refraction less than the first index of refraction, light beam 30a will be bent away from the normal 32b to surface 27.

In a first mode of operation, which is the general case illustrated by beam paths 30 and 30a-30d in FIG. 2, where beam 30 is incident on surface 25 of prism 24 at an angle $\phi_i(b)$ with normal 31, it will be seen that the angle $\phi_2(b)$ in the liquid crystal layer 28 can be determined from the expression $$\sin\phi_2(b)=(n_{prism}/n_{lc})\cdot\sin[\sin^{-1}(n_{air}\sin\phi_i/n_{prism})+\alpha],$$

where $\alpha$ is the base angle of prism 24. It will be noted that for the case where light beam 30 is directed substantially normal to surface 25 of prism 24, there will be substantially no refraction of beam 30 as it passes from air into prism 24.

Figure 9:
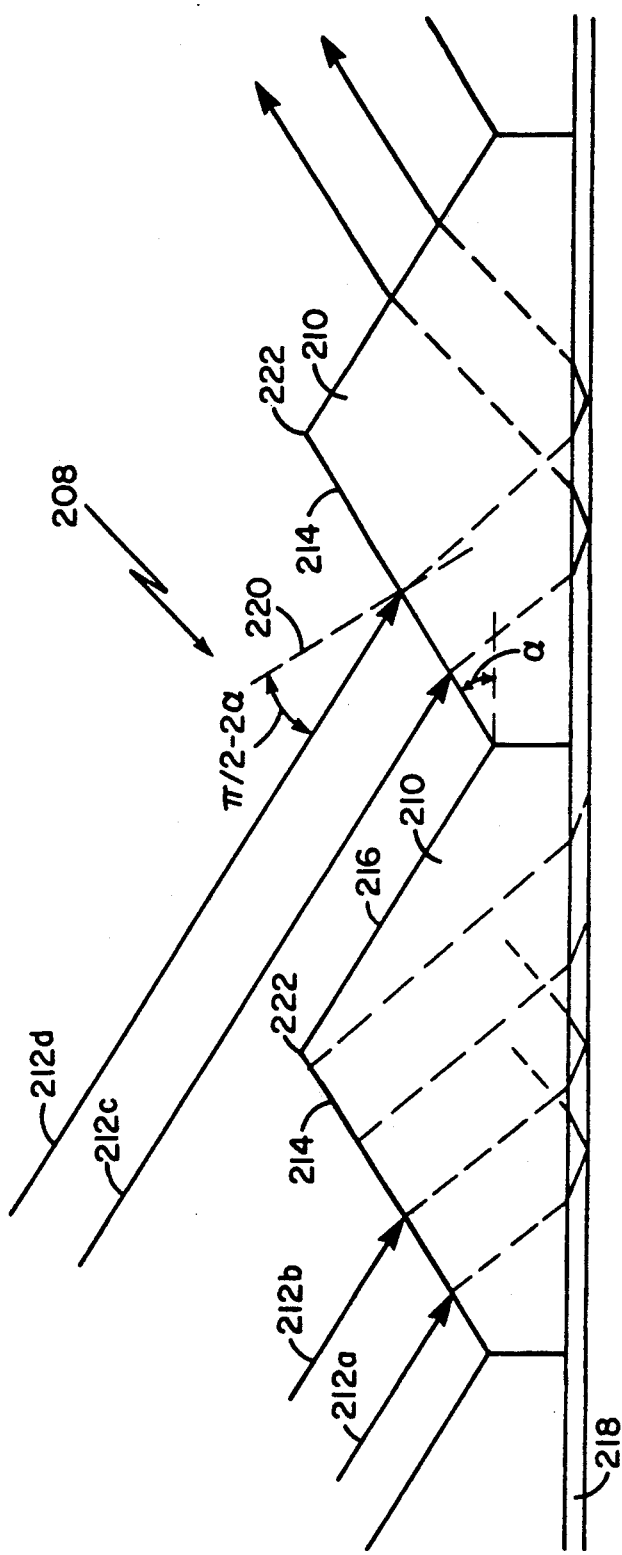
FIG. 9 illustrates an optical beam path through a beam steerer comprising a plurality of prisms.

In a second mode of operation, illustrated in FIG. 9, an optical subsystem 208 used for steering a large diameter beam comprises a plurality of prisms 210. In this case, where prisms 210 have apex angles 222 greater than 90 degrees, there will be shadowing effects if the input rays 212a-212d are orthogonally incident on surfaces 214. In this case, improved performance may be achieved by arranging optical subsystem 208 such that input rays 212a-212d comprising the incident light beam inpinge on surfaces 214 of prisms 210 at incident angles to the prism normals 220 of $\phi_i=\alpha/2-2\alpha$, where $\alpha$ is the base angle of prism 210. This arrangement places input rays 212a-212d parallel to the output faces 216 of prisms 210, thereby allowing a plurality of prisms 210 to be closely-packed to cover a large array without shadowing effects. For this case, the angle $\phi_2$ in the liquid crystal layer 218 is determined from the expression $$\sin\phi_2=(n_{prism}/n_{lc})\sin[\sin^{-1}(n_{air}\cos2\alpha/n_{prism})+\alpha].$$

The advantage provided by the present invention is demonstrated by the following discussion and numerical example. Referring again to FIG. 2, consider the path of light beam 26 with prism 24 not present. Light beam 26 passes through air (n=1) and is incident on liquid crystal layer 28 at an angle of incidence of $\phi_i(a)$. (The index of refraction $n_{lc}$ of liquid crystal layer 28 is greater than unity.) The distance $d_1$ travelled by beam 26a across layer 28 is $t/\cos\phi_2(a)$ where t is the thickness of layer 28. Since, according to Snell's Law, $\phi_2(a)=\sin^{-1}(\sin\phi_i(a)/n_{lc})$, then $d_1=t/\cos(\sin^{-1}(\sin\phi_i(a)/n_{lc}))$. In this example, beam 26a is reflected from surface 29 of layer 28, and the total pathlength traversed by light beam portion 26a within layer 28 is $$l_1=2t/\cos(\sin^{-1}(\sin\phi_i(a)/n_{lc})).$$

As the dimensions of FIG. 2 are greatly exaggerated for ease of understanding, particularly the thickness t of liquid crystal layer 28, the actual displacement of the exit rays for the cases of a prism and no prism is quite small, on the order of thickness t itself.

Consider now the path of light beam 30 with prism 24 present. Light beam 30, incident on surface 25 of prism 24 at an incidence angle of $\phi_i(b)$ is refracted toward normal 31 according to $\sin\phi_r=\sin\phi_i(b)/n_{prism}$. Relatively simple mathematical manipulations will show that the angle of incidence of refracted beam 30a at surface 27 is given by $\phi_1(b)=\phi_r+\alpha$, where $\alpha$ is the base angle of prism 24. In accordance with the teachings of the present invention, the index of refraction $n_{lc}$ of liquid crystal layer 28 is less than the index of refraction $n_{prism}$ of prism 24. Therefore, after passing through prism 24, the distance $d_2$ travelled by beam 30b across layer 28 is $$d_2=t/\cos[\sin^{-1}(n_{prism}\cdot\sin\phi_1(b)/n_{lc})].$$

In this example, beam 30b is also reflected from surface 29 of layer 28, and the total pathlength traversed by light beams 30b and 30c within layer 28 is $$l_2=2t/\cos[\sin^{-1}(n_{prism}\cdot\sin\phi_1(b)/n_{lc})].$$

It is helpful to consider now a numerical example, in which prism 24 has an index of refraction $n_{prism}=3.27$, liquid crystal layer 28 has an average index of refraction $n_{lc}=1.7$, prism 24 has a base angle of 20 degrees, and light beam 30 is directed so as to be incident on surface 25 of prism 24 at 25 degrees. Using relatively elementary manipulations, it is easily seen that $\phi_r$, the refraction angle of beam 30a with normal 31 is approximately 7.43 degrees, and that $\phi_1(b)$ is approximately 27.43 degrees. Therefore, $\phi_2(b)$, the refraction angle of beam 30b with normal 32b is calculated to be approximately 62.37 degrees. Using the above relationships, it is seen that the total distance of travel of beam 30b in liquid crystal layer 28 is approximately 4.31.t.

By way of comparison, where beam 26 is incident on surface 27 at an angle of $\phi_i(a)$ with normal 32a, such that $\phi_i(a)$ is equal to the corresponding incident angle $\phi_1(b)$ which beam 30a makes with surface 27, refraction angle $\phi_2(a)$ is seen to be approximately 15.72 degrees. Using the above relationships, it is seen that the total distance of travel of beam 26a in liquid crystal layer 28 is approximately 2.08.t. Thus, the addition of prism 24 to the disclosed optical system substantially increases the pathlength of a light beam through liquid crystal layer 28 of given thickness t, here by a factor of about 2.1. As the angle of incidence is increased toward the critical angle, 31.32° for the gallium arsenide prism, and the liquid crystal layer refractive index of the present example, the pathlength increase becomes increasingly larger.

The phase shift $\theta$ through the liquid crystal layer 28 is given by $\theta = 2\pi n_{lc} l/\lambda$, where $l = 2t/\cos\phi_2$. It is known that the liquid crystal retractive index $n_{lc}$ depends on the applied voltages, as does $\phi_2$ and l. Thus, there are two contributions to the phase shift, one from the change in liquid crystal index itself, and the other from the pathlength change accompanying the index change.

The differential phase shift $\Delta\theta$ between two voltage states $V_1$ and $V_2$ is given by
$\Delta\theta = (4\pi t/\lambda)[n_{lc}(V_1)/\cos\phi_2(V_1) - n_{lc}(V_2)/\cos\phi_2(V_2)]$.
Consider that with no applied voltage, the liquid crystal molecules are aligned nominally parallel to the incident polarization; thus, the index is nominally the extraordinary index $n_e$, which for an illustrative liquid crystal mixture, Type E7, supplied by British Drug House, is 1.8. With full applied voltage, the molecules are oriented nominally orthogonal to the input polarization; thus, for this case, the index is nominally the ordinary index, which is approximately 1.6 for the illustrative mixture.

By way of a numerical example, consider a gallium arsenide prism having a prism base angle of 20 degrees and with light energy incident at 25 degrees to the prism normal and polarized perpendicular to the plane of incidence. The liquid crystal mixture in this example is the aforementioned Type E7. For this case, a liquid crystal thickness of 3.64 $\mu$m results in a full wave differential phase shift. With no prism present, a liquid crystal layer thickness of 26.5 $\mu$m would be required for a comparable differential phase shift at nominally normal incidence. Since the switching time of the liquid crystal layer varies inversely as square of the layer thickness, the configuration including the prism provides an improvement in switching speed by a factor of approximately 53.

Other prism base angles and incidence angles may be selected to provide even greater improvements in switching speed by their corresponding reductions in the required thickness of their liquid crystal layers. Although the illustrative nematic phase liquid crystal cells have a practical lower thickness limit of approximately one $\mu$meter due to boundary layer effects, there exist other liquid crystal forms for which this limitation does not apply.

It will therefore be seen that the present invention provides the capability of using a liquid crystal cell having a layer of liquid crystal molecules of reduced thickness, while still retaining the necessary pathlength of the light beam through the molecules to obtain a full wave phase shift.

FIGS. 3-8 and the accompanying text describe six specific embodiments which incorporate the principles of the present invention. It will be recognized that no effort has been made to provide accurate scale to the elements of FIGS. 3-8, and that some dimensions are shown highly exaggerated in order to clearly depict all of the structural elements.

Figure 3:
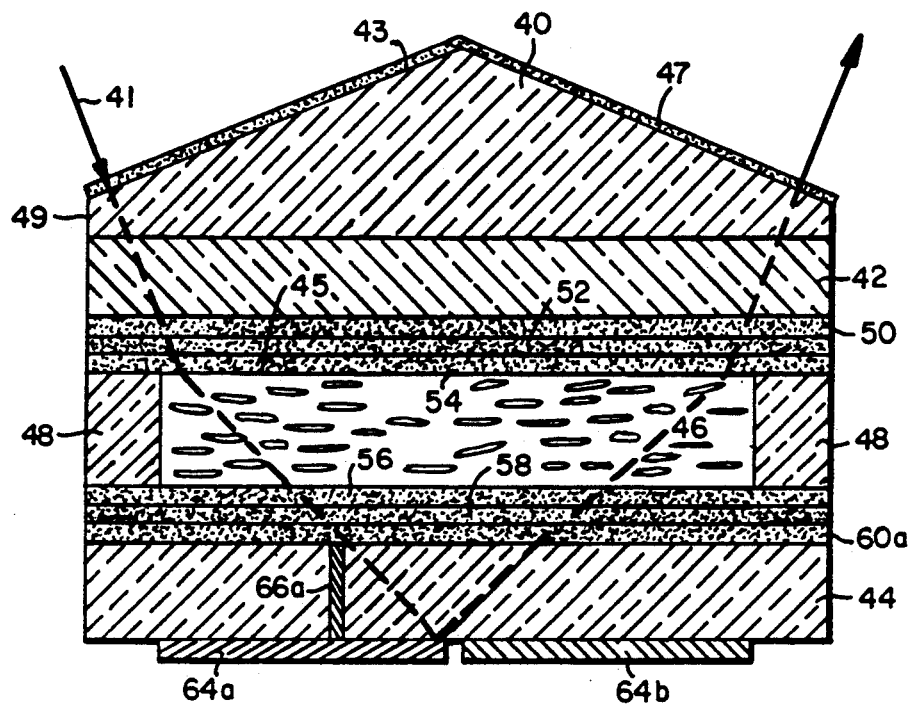
FIG. 3 is a side view representation of a first embodiment of the optical subsystem of the optical beam steerer of FIG. 1.

Referring to FIG. 3, there is shown a partly-sectional view of a first embodiment of the optical beam steerer having windows 42 and 44, which are optically transparent at the wavelengths of the light as described.

Spacers 48 maintain a fixed spacing between windows 42 and 44, and a layer 46 of liquid crystal molecules fills the space between windows 42 and 44. Window 42 includes an optically-transparent common electrode 50, and window 44 includes a plurality of optically-transparent electrodes 60 in the form of electrically-isolated, parallel stripes. Only one electrode 60a is visible in the view of FIG. 3.

Electrically-insulating layer 62 provides electrical isolation between electrodes 60 and a plurality of metallic T contact pads 64a, 64b, referred to collectively as contact pads 64. Each stripe electrode 60 is coupled to a single contact pad 64 by a conductor 66 (only conductor 66a, coupling electrode 60a with contact pad 64a, is shown in FIG. 3). Preferably, prism 40 and window 42 are fabricated of the same material and are optically contacted. Alternatively, prism 40 and window 42 are of different materials with an anti-reflection coating (not shown) between them. It will also be recognized that a reflection-free interface between dissimilar materials may be provided by an index-matching epoxy.

In the illustration of FIG. 3, the incident optical beam 41 is directed so that it impinges substantially normal on face 43 of prism 40. However, in general, an angle of incidence of up to 45 degrees, or even larger, with the normal to prism surface 73 may be preferred. In this, as well as in subsequent embodiments, it is desirable to keep the thickness of prism edge 49 as small as is practical. A thickness of approximately one millimeter is found to provide good performance.

Anti-reflection coating 47 is overlaid on prism 40 at its boundary with air. Anti-reflection coatings 52 and 58 are affixed, respectively, to the inner surfaces of windows 42 and 44. Alignment layers 54 and 56 are interposed between the layer of liquid crystal molecules 46 and the anti-reflection coatings 52 and 58 on cell windows 42 and 44, respectively, to properly align the liquid crystal molecules at the boundaries of layer 46. The alignment of the liquid crystal molecules is selected to be appropriate to the polarization of the incident light such that the liquid crystal cell functions properly as a switch. It has been determined that a preferable quiescent alignment of the liquid crystal molecules is orthogonal to the longitudinal edges of the stripe electrodes 60. The presence of the inevitable fringing fields between electrodes 60 will then reinforce the original molecular alignment established by the alignment layers 54 and 56. For this case, the liquid crystal cell acts as a phase shifter for rays polarized perpendicular to the plane of incidence. If the preferred alignment is established parallel to the stripe electrode orientation, the device will act as a phase shifter for polarization parallel to the plane of incidence. In this case a slightly thicker liquid crystal layer is required owing to propagation at less than grazing angle within the liquid crystal so the full extraordinary index is not realized, even with full voltage applied. This is a small effect.

In the present example, in which the incident optical beam is provided from a $CO_2$ laser, cell windows 42 and 44 must exhibit low absorption of the infrared light having the wavelength emitted by a $CO_2$ laser, typically at 10.6 $\mu$m. Typical candidates for the choice of cell windows 42 and 44 include semiconductors such as germanium, zinc selenide and gallium arsenide, and halide salts such as potassium chloride, all of which are relatively transparent to $CO_2$ laser light. In addition, electrode 50, which provides electrical conductivity across cell window 42, and electrodes 60, which provide a multiplicity of individual zones of electrical conductivity on cell window 44, must also be substantially optically transparent at the above-mentioned wavelength.

In the present example, optically transparent electrodes 50 and 60 are preferably provided on cell windows 42 and 44, respectively, by a process of ion implantation, as disclosed in co-pending U.S. patent application, Ser. No. 162,922, "Liquid Crystal Cell Windows," filed Mar. 2, 1988, for D. Resler, and assigned to the same assignee as the present invention, which application is incorporated herein by reference. Cell windows 42 and 44 are preferably fabricated of gallium arsenide (GaAs), as discussed in the cited patent application. In addition, where subsequent references to optically-transparent electrodes are made in the descriptions of the embodiments of FIGS. 4-8, it will be understood that the electrodes are preferably provided by the above-mentioned ion implantation process. Illustratively, for the wavelengths of $CO_2$ beams, stripe electrodes 60 may be 1-9 $\mu$meters in width, and separated from one another by approximately 9-1 $\mu$meter gaps, respectively, resulting in a 10 $\mu$m electrode period. Smaller electrode periods are useful for larger angle beam steering or shorter wavelengths.

A preferred method for providing electrical connectivity to a multiplicity of stripe electrodes 60, including utilization of corresponding multiplicities of contact pads 64 and conductors 66, is disclosed in the above-referenced Dorschner et al. patent application.

Anti-reflection coatings 47, 52 and 58 reduce the reflections when light passes from one optically-transmissive medium to another. Single layer and multiple anti-reflection coatings are well known in the art and are used to effectively eliminate reflections. Ideally, a single layer anti-reflection coating comprises a material whose effective refractive index is the geometric mean of the refractive indices of the two media to be matched. By way of example, anti-reflection coatings 52 and 58 at the inner surfaces of cell windows 42 and 44, respectively, may comprise a single quarter-wave layer of yttria (n=1.58) or zinc sulfide (n=2.2) or even zinc selenide (n=2.4), to adequately match the liquid crystal film (n=1.7) to a GaAs prism (n=3.27), for the case of beam polarization perpendicular to the plane of incidence. For the case of beam polarization parallel to the plane of incidence, yttria, with its lower index of refraction, is preferred. In some instances, as with halide salt windows, the refractive indices of cell windows 42 and 44 and the liquid crystal molecules of layer 46 may be sufficiently close that anti-reflection coatings 52 and 58 are not necessary. In all cases, multiple layer anti-reflection coatings may be used for improved performance, as is well known in the art.

In order to exhibit the desired birefringence in bulk devices, the liquid crystals must be properly and uniformly aligned. This is usually done by special treatment of the surfaces of cell windows 42 and 44 adjacent liquid crystal layer 46. If the inner surfaces of cell windows 42 and 44 have been "prepared" or striolated by, for example, rubbing unidirectionally with fine grinding powder to produce extremely fine, parallel striolae, the liquid crystal molecules of layer 46 adjacent to the inner surfaces of cell windows 42 and 44 will tend to align themselves along and in these minute grooves and thereby be preferentially aligned. If liquid crystal layer is thin, as is the intended case, and if the grooves on the inner surfaces of cell windows 42 and 44 are parallel, as in this example, this positional orientation is transferred across the cell by the natural tendencies of the liquid crystal molecules to align parallel to one another.

Typical depths of the striolae are only a few Angstrom units, to match the effective diameters of the liquid crystal molecules. An alternate means of preparing the inner surfaces of cell windows 42 and 44, as is known, is ion beam deposition of dielectric layers 54 and 56 at a near grazing angle to produce small parallel ripples in their surfaces adjacent layer 46. This shallow angle deposition technique is currently the preferred technique. With either method, the striolae are so much smaller than a wavelength that they contribute negligible scatter, even in the visible spectrum; therefore, scatter in the infrared is quite insignificant.

The liquid crystal molecules of layer 46 are, illustratively, long, thin, rod-like organic molecules of the so-called "nematic" phase. These molecules exhibit long range molecular order in the liquid state when properly aligned at the surfaces. The molecules of layer 46, as illustrated in FIG. 3 (as well as the molecules in the corresponding liquid crystal layers of the embodiments illustrated in FIGS. 4-8) are shown as preferentially aligned in their quiescent state. It will be recognized that for a sufficient voltage applied between the individual stripe electrodes and the common electrodes, the molecules will tend to align along the direction of the resultant electric field, i.e., vertically, in the illustrations.

In one mode of operation, the incident optical beam 41 is directed so that it impinges substantially normal on face 43 of prism 40. As may be seen in FIG. 3, light beam 41 is refracted away from the normal to boundary surface 45 as it passes into layer 46, and is refracted toward the normal to surface 45 as it passes out of layer 46. Preferably, beam 41 is incident on surface 43 at between 0 and 45 degrees.

The separations between contact pads 64 are preferably made small relative to a wavelength of the light used, in order that there be minimal reduction in reflectivity across the lower mirror surface, and that there be minimal diffraction from these spacings. It may also be preferable to make these separations irregular (on a wavelength scale) so as to distribute continuously in space the energy from the diffraction lobes, thereby avoiding concentrations of energy into specific directions.

Figure 4:
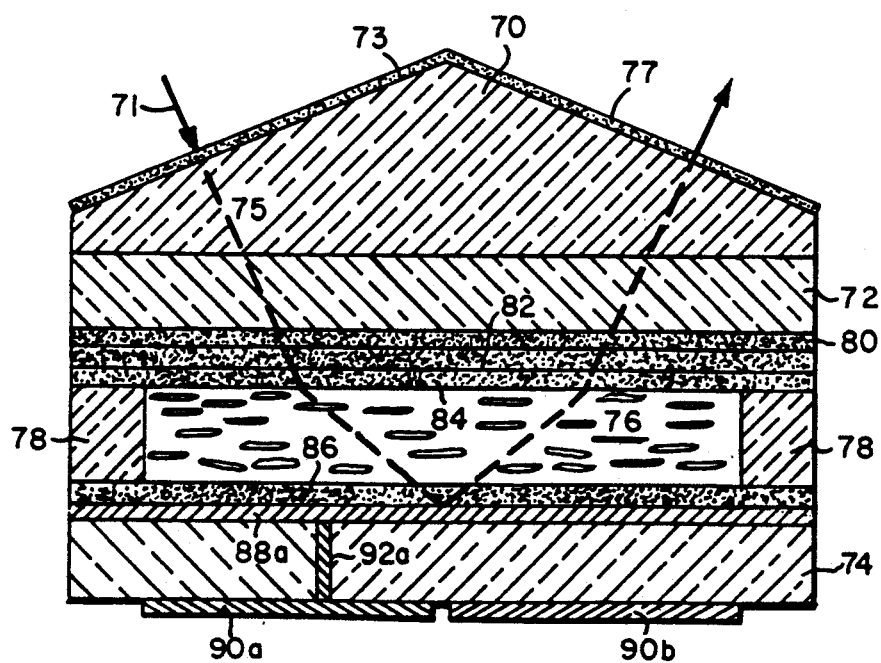
FIG. 4 is a side view representation of a second embodiment of the optical subsystem of the optical beam steerer of FIG. 1.

Referring to FIG. 4, there is shown a partly-sectional view of a second embodiment of the optical beam steerer of FIG. 1. A liquid crystal cell comprises a cell window 72, which is substantially optically-transparent at the wavelengths of the light as described. Spacers 78 maintain a fixed spacing between window 72 and insulating support structure 74, and a layer 76 of liquid crystal molecules fills the space between window 72 and insulator 74. Window 72 includes an optically-transparent common electrode 80, and insulator 74 includes a plurality of optically-reflective electrodes 88 in the form of electrically-isolated, parallel stripes. Only one electrode 88a is visible in the view of FIG. 4.

Insulating layer 74 provides electrical isolation between electrodes 88 and a multiplicity of metallic contact pads 90, represented in FIG. 4 by contact pads 90a and 90b. Each stripe electrode 88 is coupled to a single contact pad 90 by a conductor 92 (only conductor 92a, coupling electrode 88a with contact pad 90a, is shown in FIG. 4). Prism 70 is optically coupled to window 72.

In one mode of operation, the incident optical beam 71 is directed so that it impinges substantially normal on face 73 of prism 70. As may be seen in FIG. 4, light beam 71 is refracted away from the normal to boundary surface 75 as it passes into layer 76, and is refracted toward the normal to surface 75 as it passes out of layer 76. Preferably, beam 71 is incident on surface 73 at between 0 and 45 degrees.

Anti-reflection coating 77 is overlaid on prism 70 at its boundary with air, and anti-reflection coating 82 is affixed to the inner surface of window 72. Alignment layers 84 and 86 are interposed between the layer 76 of liquid crystal molecules and the anti-reflection coating 82 on cell window 72 and insulator 74, respectively, to properly align the liquid crystal molecules at the boundaries of layer 76. It should be noted that when stripe electrodes 88 are formed by the preferred ion-implantation technique, the surface of insulation 74 remains planar (on a wavelength scale), and the anti-reflection coating 86 lies flat over both the electrodes 88 and the non-ion-implanted portions of insulator 74.

In the embodiment of FIG. 4, and in subsequent embodiments employing a multiplicity of optically-reflective stripe electrodes, these electrodes 88 are preferably fabricated of gold deposited on an insulating substrate, using a known metal deposition process. Other metals which reflect efficiently in the wavelength region of operation may also be used. Insulating substrate 74 may typically comprise alumina or gallium arsenide.

Figure 5:
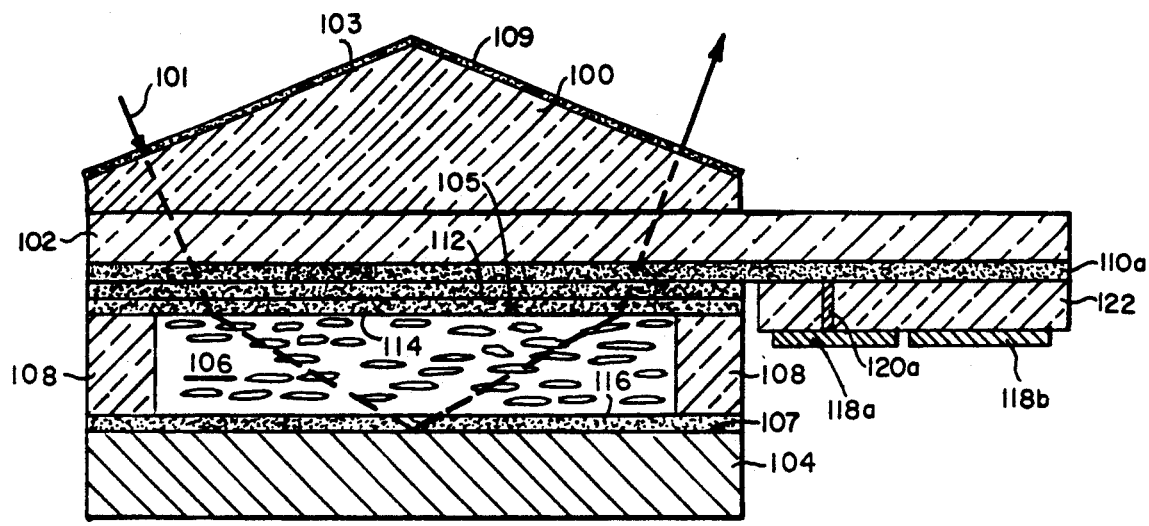
FIG. 5 is a side view representation of a third embodiment of the optical subsystem of the optical beam steerer of FIG. 1.

Referring to FIG. 5, there is shown a partly-sectional view of a third embodiment of the optical beam steerer of FIG. 1. A liquid crystal cell comprises a cell window 102, which is substantially optically-transparent at the wavelengths of the light as described. Spacers 108 maintain a fixed spacing between cell window 102 and support structure 104, and a layer 106 of liquid crystal molecules fills the space between window 102 and support 104. Cell window 102 includes a plurality of optically-transparent electrodes 110 in the form of electrically-isolated, parallel stripes. Only one electrode 110a is visible in the view of FIG. 5. Support structure 104, which functions as the common electrode, comprises a continuous optically-reflective, electrically-conducting material such as gold, and may preferably be a metallic mirror. Alternatively, support structure 104 may comprise a window of germanium or other material of refractive index greater than that of GaAs, such that there is total internal reflection at the inner window surface 107.

Cell window 102, including stripe electrodes 110, extends beyond the region of the liquid crystal molecules in layer 106, so as to provide a means for providing individual electrical signals to electrodes 110. Insulating layer 122, covering stripe electrodes 110, provides electrical isolation between electrodes 110 and a multiplicity of metallic contact pads 118, represented in FIG. 5 by contact pads 118a and 118b. Each stripe electrode 110 is coupled to a single contact pad 118 by a conductor 120 which extends through insulator 122 (only conductor 120a, coupling electrode 110a with contact pad 118a, is shown in FIG. 5). Prism 100 is optically coupled to window 102.

In one mode of operation, the incident optical beam 101 is directed so that it impinges substantially normal on face 103 of prism 100. As may be seen in FIG. 5, light beam 101 is refracted away from the normal to boundary surface 105 as it passes into layer 106, and is refracted toward the normal to surface 105 as it passes out of layer 106. Preferably, beam 101 is incident on surface 103 at between 0 and 45 degrees.

Anti-reflection coating 109 is overlaid on prism 100 at its boundary with air, and anti-reflection coating 112 is affixed to the inner surface of window 102, overlying stripe electrodes 110. Alignment layers 114 and 116 are interposed between the layer 106 of liquid crystal molecules and the anti-reflection coating 112 on cell window 102 and mirror 104, respectively, to properly align the liquid crystal molecules at the boundaries of layer 106.

Figure 6:
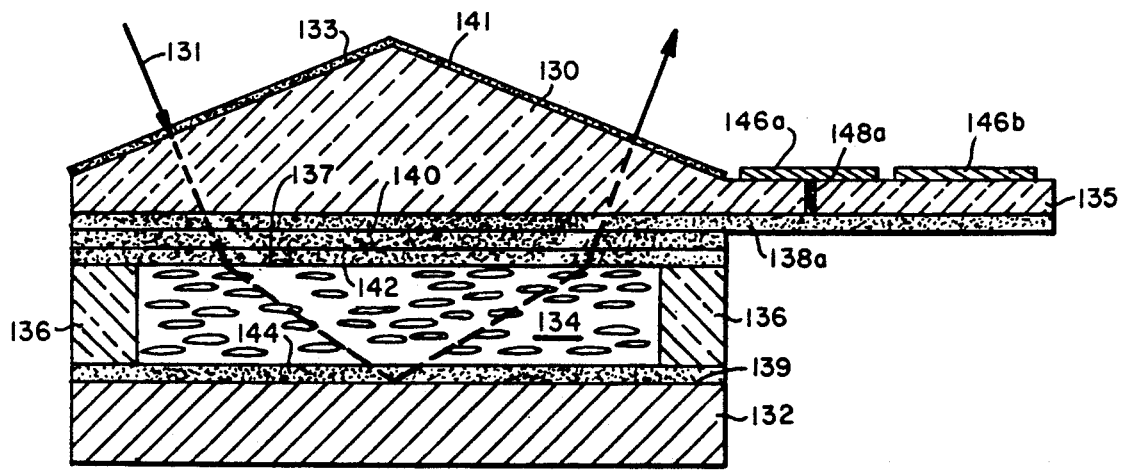
FIG. 6 is a side view representation of a fourth embodiment of the optical subsystem of the optical beam steerer of FIG. 1.

Referring to FIG. 6, there is shown a partly-sectional view of a fourth embodiment of the optical beam steerer of FIG. 1. A liquid crystal cell comprises a prism 130, which is substantially optically-transparent at the wavelengths of the light as described. Spacers 136 maintain a fixed spacing between prism 130 and support structure 132, and a layer 134 of liquid crystal molecules fills the space between prism 130 and support 132. Prism 130 includes a plurality of optically-transparent electrodes 138 in the form of electrically-isolated, parallel stripes. Only one electrode 138a is visible in view of FIG. 6. Support structure 132, which functions as the common electrode, comprises an optically-reflective, electrically-conducting material such as gold, and may preferably be a metallic mirror. Alternatively, support structure 132 may comprise a window of a halide salt or other material of effective refractive index less than that of the liquid crystal, such that there is total internal reflection at the inner window surface 139.

Prism 130, including stripe electrodes 138, includes an extension 135 which projects beyond the region of the liquid crystal molecules in layer 134, so as to provide a means for coupling individual electrical signals to electrodes 138. Extension 135 provides electrical isolation between electrodes 138 and a multiplicity of metallic contact pads 146, represented in FIG. 6 by contact pads 146a and 146b. Each stripe electrode 138 is coupled to a single contact pad 146 by a conductor 148 (only conductor 148a, coupling electrode 138a with contact pad 146a, is shown in FIG. 6).

In one mode of operation, the incident optical beam 131 is directed so that it impinges substantially normal on face 133 of prism 130. As may be seen in FIG. 6, light beam 131 is refracted away from the normal to boundary surface 137 as it passes into layer 134, and is refracted toward the normal to surface 137 as it passes out of layer 134. Preferably, beam 131 is incident on surface 133 at between 0 and 45 degrees.

Anti-reflection coating 141 is overlaid on prism 130 at its boundary with air, and anti-reflection coating 140 is affixed to the inner-facing surface of prism 130. Alignment layers 142 and 144 are interposed between the layer 134 of liquid crystal molecules and the anti-reflection coating 141 on prism 130 and the anti-reflection coating 140 on mirror 132, respectively, to properly align the liquid crystal molecules at the boundaries of layer 134.

Figure 7:
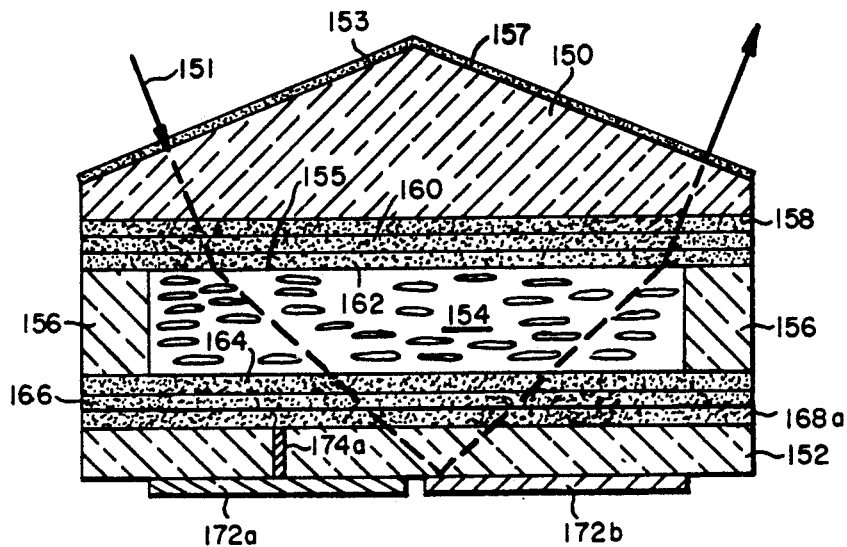
FIG. 7 is a side view representation of a fifth embodiment of the optical subsystem of the optical beam steerer of FIG. 1.

Referring to FIG. 7, there is shown a partly-sectional view of a fifth embodiment of the optical beam steerer of, FIG. 1. A liquid crystal cell comprises a prism 150 and a cell window 152, both of which are substantially optically-transparent at the wavelengths of the light as described. Spacers 156 maintain a fixed spacing between prism 150 and cell window 152, and a layer 154 of liquid crystal molecules fills the space between prism 150 and cell window 152. Prism 150 includes an optically-transparent common electrode 158, and window 152 includes a plurality of optically-transparent electrodes 168 in the form of electrically-isolated, parallel stripes. Only one electrode 168a is visible in the view of FIG. 7.

Window 152 provides electrical isolation between electrodes 168 and a multiplicity of metallic contact pads 172, represented in FIG. 7 by contact pads 172a and 172b. Each stripe electrode 168 is coupled to a single contact pad 172 by a conductor 174 (only conductor 174a, coupling electrode 168a with contact pad 172a, is shown in FIG. 7).

In one mode of operation, the incident optical beam 151 is directed so that it impinges substantially normal on face 153 of prism 150. As may be seen in FIG. 7, light beam 151 is refracted away from the normal to boundary surface 155 as it passes into layer 154, and is refracted toward the normal to surface 155 as it passes out of layer 154. Preferably, beam 151 is incident on surface 153 at between 0 and 45 degrees.

Anti-reflection coating 157 is overlaid on prism 150 at its boundary with air. Anti-reflection coatings 160 and 166 are affixed, respectively, to the inner-facing surfaces of prism 150 and cell window 152. Alignment layers 162 and 164 are interposed between the layer of liquid crystal molecules 154 and the anti-reflection coating 160 on prism 150 and the anti-reflection coating 166 on cell window 152, respectively, to properly align the liquid crystal molecules at the boundaries of layer 154.

Figure 8:
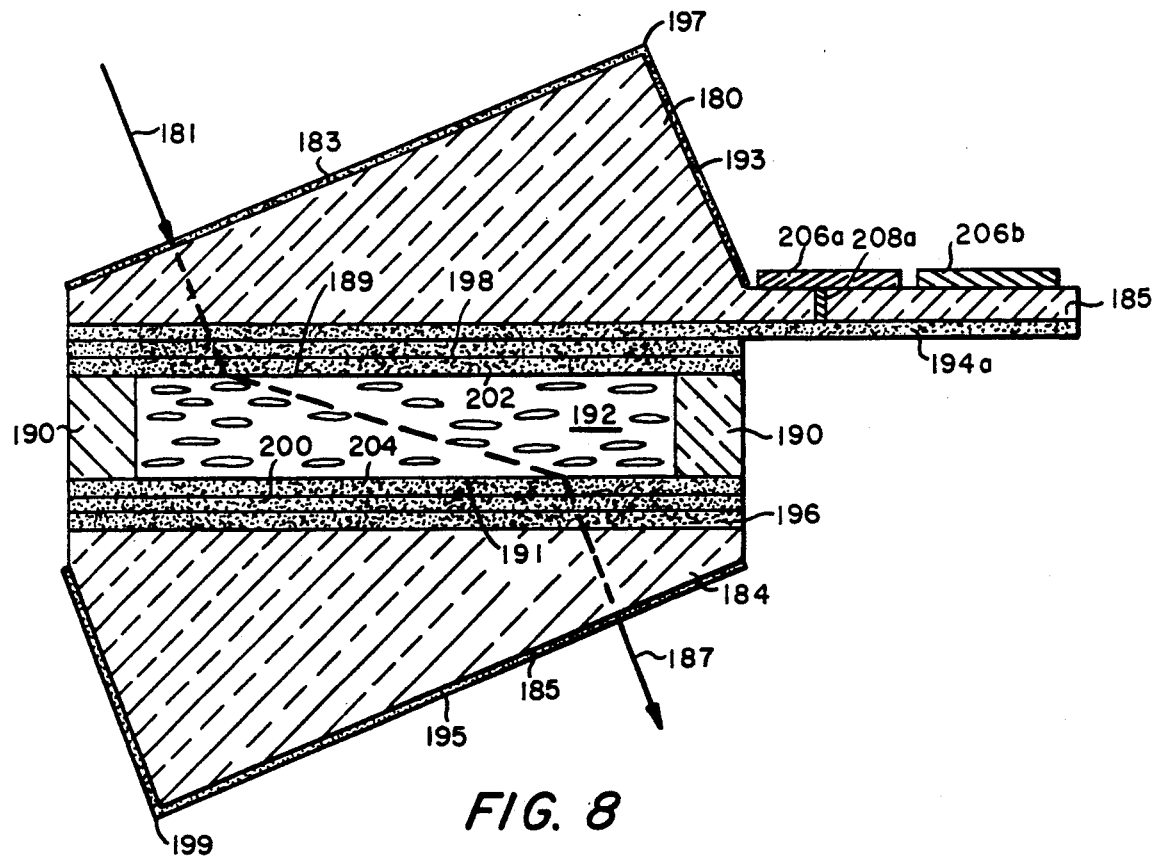
FIG. 8 is a side view representation of a sixth embodiment of the optical subsystem of an optical beam steerer.

Referring to FIG. 8, there is shown a partly-sectional view of a sixth embodiment of the optical beam steerer of FIG. 1. Unlike the previously-described embodiments, this embodiment operates by transmission of the light beam through the optical system, as opposed to reflection of the beam from within the optical system. A liquid crystal cell comprises a first prism 180 and a second prism 184, both of which are substantially optically-transparent at the wavelengths of light as described. Spacers 190 maintain a fixed spacing between prisms 180 and 184, and a layer 192 of liquid crystal molecules fills the space between prisms 180 and 184. Prism 180 includes a plurality of optically-transparent electrodes 194 in the form of electrically-isolated, parallel stripes. Only one electrode 194a is visible in the view of FIG. 8. Prism 184 includes an optically-transparent common electrode 196.

Prism 180, including stripe electrodes 194, includes an extension 185 which projects beyond the region of the liquid crystal molecules in layer 192, so as to provide a means for coupling individual electrical signals to electrodes 194. Extension 185 provides electrical isolation between electrodes 194 and a multiplicity of metallic contact pads 206, represented in FIG. 8 by contact pads 206a and 206b. Each stripe electrode 194 is coupled to a single contact pad 206 by a conductor 208 (only conductor 208a, coupling electrode 194a with contact pad 206a, is shown in FIG. 8).

In one mode of operation, the incident optical beam 181 is directed so that it impinges substantially normal on face 183 of prism 180. As may be seen in FIG. 8, light beam 181 is refracted away from the normal to boundary surface 189 as it passes into layer 192, and is refracted toward the normal to surface 191 as it passes out of layer 192 into prism 184. Preferably, beam 181 is incident on surface 183 at between 0 and 45 degrees.

It will be noted that the shapes of prisms 180 and 184, as illustrated in FIG. 8, provide the dual benefit of minimal reflections at prism boundaries 183 and 184, as a result of normal incidence of beams 181 and 187, as well as filling the beam aperture, as a result of the construction of prisms 180 and 184 such that their apex angles 197 and 199 are right angles. It will also be noted that the thickness of liquid crystal layer 192 must be twice as thick as the layer 28 defined in the equations accompanying the text describing FIG. 2, for an equivalent benefit of increased path length.

Anti-reflection coatings 193 and 195 are overlaid on prisms 180 and 184, respectively, at their respective boundaries with air. Anti-reflection coatings 198 and 200 are affixed, respectively, to the inner surfaces of prisms 180 and 184. Alignment layers 202 and 204 are interposed between the layer 192 of liquid crystal molecules and the anti-reflection coatings 193 and 195 on prisms 180 and 184, respectively, to properly align the liquid crystal molecules at the boundaries of layer 192.

While the principles of the present invention have been demonstrated with particular regard to the illustrated structure of the figures, it will be recognized that various departures from such illustrative structure may be undertaken in the practice of the invention. The scope of this invention is not intended to be limited to the structure disclosed herein but should instead be gauged by the breadth of the claims which follow.

What is claimed is:

1. Apparatus for deflecting an incident optical beam, said apparatus comprising:
   a liquid crystal cell element including a first window having a common electrode, a second window having a multiplicity of electrodes in the form of electrically-isolated parallel stripes, and a layer of liquid crystal molecules intermediate said first and second windows;
   means for coupling a multiplicity of control signals individually between said multiplicity of stripe electrodes and said common electrode, thereby creating local variations of refractive index in said liquid crystal layer; and
   means for increasing the distance traveled by said optical beam within said layer of liquid crystal molecules, comprising refractive means interposed between said incident optical beam and one of said first and second windows, said refractive means increasing the angle of incidence of said beam entering said liquid crystal cell.

2. The apparatus according to claim 1 wherein said common electrode is optically-transparent, said common electrode being provided on said first window by ion implantation.

3. The apparatus according to claim 1 wherein said multiplicity of stripe electrodes are substantially transparent to light having wavelength of said optical beam.

4. The apparatus according to claim 3 wherein said multiplicity of transparent stripe electrodes are provided on said second window by ion implantation.

5. The apparatus according to claim 3 further including reflecting means adjacent the other of said first and second windows for reflecting said optical beam.

6. The apparatus according to claim 1 wherein said refractive means comprises a prism, said prism having an index of refraction greater than the index of refraction of said liquid crystal cell.

7. The apparatus according to claim 6 wherein said prism includes a first face adjoining said one of said first and second windows, and wherein said incident beam is directed onto a second face of said prism at an angle of incidence between 0 and 45 degrees.

8. Apparatus for deflecting an incident optical beam, said apparatus comprising:

a liquid crystal cell including a first window having an optically-transparent common electrode, a second window having a multiplicity of transparent electrodes in the form of electrically-isolated parallel stripes, and a layer of liquid crystal molecules intermediate said first and second windows;

means for coupling a multiplicity of control signals individually between said multiplicity of transparent stripe electrodes and said common electrode, thereby creating local variations of refractive index in said liquid crystal layer;

means responsive to an optical beam exiting from said liquid crystal cell for reflecting said optical beam back through said liquid crystal cell; and means for increasing the distance traveled by said optical beam within said layer of liquid crystal molecules, comprising refractive means interposed between said incident optical beam and one of said first and second windows, said refractive means increasing the angle of incidence of said beam entering said liquid crystal cell.

9. The apparatus according to claim 8 wherein said optically-transparent common electrode is provided on said first window by ion implantation.

10. The apparatus according to claim 8 wherein said multiplicity of transparent stripe electrodes are provided on said second window by ion implantation.

11. The apparatus according to claim 8 wherein said refractive means comprises a prism, said prism having an index of refraction greater than the index of refraction of said liquid crystal cell.

12. The apparatus according to claim 11 wherein said prism includes a first face adjoining said one window, and wherein said incident beam is directed onto a second face of said prism at an angle of incidence between 0 and 45 degrees.

13. Apparatus for deflecting an incident optical beam, said apparatus comprising:

a liquid crystal cell including a first window having an optically-transparent common electrode, an electrically-insulating second window having a multiplicity of electrodes in the form of electrically isolated, optically-reflective, parallel stripes, and a layer of liquid crystal molecules intermediate said first and second windows;

said optical element positioned so that said incident optical beam is incident on said first window, said beam being reflected from said stripe electrodes;

means for coupling a multiplicity of control signals individually between said multiplicity of stripe electrodes and said common electrode, thereby creating local variations of refractive index in said liquid crystal layer; and means for increasing the distance traveled by said optical beam within said layer of liquid crystal molecules, comprising refractive means interposed between said incident optical beam and said first window, said refractive means increasing the angle of incidence of said beam entering said liquid crystal cell.

14. The apparatus according to claim 13 wherein said optically-transparent common electrode is provided on said first window by ion implantation.

15. The apparatus according to claim 13 wherein said optically-reflective parallel stripe electrodes are metallic.

16. The apparatus according to claim 13 wherein said refractive means comprises a prism, said prism having an index of refraction greater than the index of refraction of said liquid crystal cell.

17. The apparatus according to claim 16 wherein said prism includes a first face adjoining said first window, and wherein said incident beam is directed normal to a second face of said prism.

18. Apparatus for deflecting an incident optical beam, said apparatus comprising:

a liquid crystal cell including a first window having an optically-transparent common electrode, an electrically-insulating second window having a multiplicity of electrodes in the form of electrically isolated, optically-transparent, parallel stripes, and a layer of liquid crystal molecules intermediate said first and second windows;

means for coupling a multiplicity of control signals individually between said multiplicity of stripe electrodes and said common electrode, thereby creating local variations of refractive index in said liquid crystal layer; and means for increasing the distance traveled by said optical beam within said layer of liquid crystal molecules, comprising first and second refractive means, said first refractive means being interposed between said incident optical beam and said first window for increasing the angle of incidence of said beam entering said liquid crystal cell, said second refractive means being adjacent said second window for decreasing the angle of incidence of said beam exiting said liquid crystal cell.

19. The apparatus according to claim 18 wherein said optically-transparent common electrode is provided on said first window by ion implantation.

20. The apparatus according to claim 18 wherein said multiplicity of transparent stripe electrodes are provided on said second window by ion implantation.

21. The apparatus according to claim 18 wherein said first and second refractive means comprise prisms, said first and second prisms each having indexes of refraction greater than the index of refraction of said liquid crystal cell.

22. The apparatus according to claim 21 wherein said first prism includes a first face adjoining said first window, and wherein said incident beam is directed normal to a second face of said first prism.

* * * * *